US012607459B2

(12) United States Patent
Ghim et al.

(10) Patent No.: US 12,607,459 B2
(45) Date of Patent: Apr. 21, 2026

(54) REAL-TIME THREE-DIMENSIONAL SHAPE MEASUREMENT SYSTEM AND SHAPE MEASUREMENT METHOD USING DIAGONAL LINE PATTERN IRRADIATION METHOD

(71) Applicant: KOREA RESEARCH INSTITUTE OF STANDARD AND SCIENCE, Daejeon (KR)

(72) Inventors: Young-Sik Ghim, Sejong (KR); The Manh Nguyen, Daejeon (KR); Hyug-Gyo Rhee, Deajeon (KR)

(73) Assignee: KOREA RESEARCH INSTITUTE OF STANDARD AND SCIENCE, Daejeon (KR)

( * ) Notice: Subject to any disclaimer, the term of this patent is extended or adjusted under 35 U.S.C. 154(b) by 322 days.

(21) Appl. No.: 18/352,459

(22) Filed: Jul. 14, 2023

(65) Prior Publication Data

US 2023/0358532 A1 Nov. 9, 2023

Related U.S. Application Data

(63) Continuation of application No. PCT/KR2021/008409, filed on Jul. 2, 2021.

(30) Foreign Application Priority Data

Mar. 5, 2021 (KR) ........................ 10-2021-0029570

(51) Int. Cl.
*G06V 40/16* (2022.01)
*G01B 11/25* (2006.01)
(Continued)

(52) U.S. Cl.
CPC ............ *G01B 11/2513* (2013.01); *G06T 7/50* (2017.01); *G06T 17/00* (2013.01); *G06T 2200/04* (2013.01)

(58) Field of Classification Search
CPC . G01B 11/2513; G01B 11/25; G01B 11/2504; G01B 2210/56; G06T 7/50;
(Continued)

(56) References Cited

U.S. PATENT DOCUMENTS

2010/0310130 A1* 12/2010 Beghuin .......... G01N 21/95623
382/106
2019/0316898 A1* 10/2019 Kim ................... G01B 11/2441

FOREIGN PATENT DOCUMENTS

| | | |
|---|---|---|
| JP | 2001-349710 A | 12/2001 |
| KR | 10-1955847 B1 | 3/2019 |
| WO | 2018-219442 A1 | 12/2018 |

OTHER PUBLICATIONS

Nguyen et al., Single-shot deflectometry for dynamic 3D surface profile measurement by modified spatial carrier frequency phase-shifting method, Feb. 28, 2019, Scientific Reports, pp. 1-15 (Year: 2019).*

(Continued)

*Primary Examiner* — Amandeep Saini
*Assistant Examiner* — Mehrazul Islam
(74) *Attorney, Agent, or Firm* — NKL Law; Jae Youn Kim

(57) ABSTRACT

The present disclosure relates to relates to a system and method for measuring a real-time three dimensional shape using a diagonal fringe pattern. Particularly, in the deflectometry applied to real-time three dimensional shape measurement of freeform surfaces, a system for acquiring a real-time three dimensional phase using a diagonal fringe pattern includes: a pattern generation portion that generates a single-direction pattern in the diagonal direction and project the generated pattern onto a measurement object; a detector that obtains an image of a deformed pattern reflected from the measurement object; and a phase acquisition portion that partially differentiates and integrates a (Continued)

phase of the diagonal pattern in the x axis direction and y axis direction respectively, to obtain an x axis direction phase component and a y direction phase component.

7 Claims, 5 Drawing Sheets

(51) Int. Cl.
*G06T 7/50*          (2017.01)
*G06T 17/00*          (2006.01)

(58) Field of Classification Search
CPC ..... G06T 17/00; G06T 2200/04; G06T 7/521;
G06T 7/60; G03F 7/00
See application file for complete search history.

(56)          References Cited

OTHER PUBLICATIONS

Perciante et al. Wrapping-free phase retrieval with applications to interferometry, 3D-shape profiling, and deflectometry. Applied optics. Vol. 54, No. 10, Mar. 31, 2015, pp. 3018-3023. See abstract, pp. 3020-3022 and figure 1.
Wang et al. Fast and high precision spatial carrier frequency phase shifting algorithm based on the second order difference. Optics Communications. vol. 454, Aug. 9, 2019, pp. 124310(1)-124310(5). See p. 2.

* cited by examiner

REAL-TIME THREE-DIMENSIONAL SHAPE MEASUREMENT SYSTEM AND SHAPE MEASUREMENT METHOD USING DIAGONAL LINE PATTERN IRRADIATION METHOD

CROSS-REFERENCE TO RELATED APPLICATIONS

This application is a continuation application of PCT/KR2021/008409, filed on Jul. 2, 2021, the contents of which are incorporated herein by reference in their entirety.

BACKGROUND

Technical Field

The present disclosure relates to a system and method for real-time measurement of a three dimensional shape using a diagonal fringe pattern.

Related Art

A freeform surface refers to an arbitrary surface that exhibits asymmetry with respect to any axis. The key components of recent state-of-the-art optical devices such as smart glasses and head-mounted displays (HMDs) are all comprised of freeform surfaces. Extensive research is being conducted worldwide due to the fact that these freeform surfaces not only exceed the limitations of traditional spherical or aspherical optics in terms of optical performance but also simultaneously fulfill design requirements. The deflectometry a prominent technique capable of measuring the three-dimensional shape of such freeform surfaces. Unlike conventional interferometry, it enables three-dimensional shape measurement of the target object without the need for a separate reference surface. As a result, it is gaining recognition as a next-generation apparatus for three-dimensional shape measurement.

The fundamental principle of the deflectometry measure the variations in surface slope by illuminating the surface of the target object, which is to be measured, with a fringe pattern having a periodic pattern and then analyzing the phase of the deformed pattern caused by the shape of the target object. That is, under the assumption that the shape of the target object to be measured is described as $z=z(x, y)$, the measurements obtained through the deflectometry are components of the x axis direction gradient ($\partial z/\partial x$) and the y axis direction gradient ($\partial z/\partial y$) in accordance with the direction of the incident pattern. Therefore, by integrating the two gradient components in the x and y directions obtained from the measured phase, it is possible to restore and obtain a three-dimensional shape of the target object.

At this time, in order to minimize errors caused by external vibrations and environmental changes during the measurement process and accurately measure the three-dimensional surface shape, it is essential to be able to measure the phase at a fast speed above all else. If the measurement object is affected by external environmental errors during the measurement process, this can cause significant errors in the measurement results.

SUMMARY

Technical Problem

Therefore, the present disclosure is contrived to solve conventional problems as described above. According to an embodiment of the present disclosure, it aims to provide a real-time three dimensional deflectometry system and shape measurement method using a diagonal pattern scanning method that can effectively and quickly separate the x direction and y direction gradient components through derivation and integration, using a single-direction pattern in the diagonal direction instead of using a composite pattern that scans patterns in the x direction and y direction simultaneously.

Meanwhile, technical objects to be achieved in the present invention are not limited to the aforementioned technical objects, and other technical objects, which are not mentioned above, will be apparently understood to a person having ordinary skill in the art from the following description.

Technical Solution

According to a first aspect of the present disclosure, it can be achieved by a system for real-time acquisition of a three dimensional phase using a diagonal fringe pattern in the deflectometry applied to real-time three dimensional shape measurement of freeform surfaces, the system for real-time acquisition of a three dimensional phase using a diagonal fringe pattern including: a pattern generation portion that generates a single-direction pattern in the diagonal direction and project the generated pattern onto a measurement object; a detector that obtains an image of a deformed pattern reflected from the measurement object; and a phase acquisition portion that partially differentiates and integrates a phase of the diagonal pattern in the x axis direction and y axis direction respectively, to obtain an x axis direction phase component and a y direction phase component.

A single-direction pattern in the diagonal direction generated from the pattern generation portion is represented by the following equation 1:

$$I_s(x_s, y_s) = \left(\frac{G}{2}\right)\{1 + \cos(2\pi f_x x_s + 2\pi f_y y_s)\}, \qquad \text{[Equation 1]}$$

wherein

G is an arbitrary constant value representing a background light and a modulation amplitude, $f_x$ and $f_y$ represent carrier frequency components in the x axis and y axis directions, and $(x_s, y_s)$ represents a position of a screen pixel.

A pattern obtained through the detector is represented by the following equation 2:

$$\text{[Equation 2]}$$
$$I_d(x, y) = A(x, y) + B(x, y)\cos\{2\pi f_x x + 2\pi f_y y + \phi_x(x, y) + \phi_y(x, y)\},$$

wherein (x,y) is a camera pixel position, A(x,y) and B(x,y) represent a background light component and a modulation amplitude, and $\varphi_x$ and $\varphi_y$ represent an x direction phase component and a y direction phase component of the measured object.

Further, the diagonal pattern phase is calculated by normalizing a first-order derivation component and a second-order derivation component and dividing each other in equation 2.

3

The first-order derivation, $$I_{dx}^* + I_{dy}^*$$

is calculated from the following equation 3, and the second-order derivation component, $$I_{dx}^* + I_{dy}^*$$

is calculated from the following equation 4:

$$I_{dx}^* = -2\pi f_x B \sin\{\varphi\},\ I_{dy}^* = -2\pi f_y B \sin(\varphi) \quad \text{[Equation 3]}$$

$$I_{dx}^* = -4\pi^2 f_x^2 B \cos\{\varphi\},\ I_{dy}^* = -4\pi^2 f_y^2 B \cos(\varphi) \quad \text{[Equation 4]}$$

Further, the diagnol pattern phase id represented by the following equation 5:

$$\varphi = \arctan\left(\frac{\|I_{dx}' + I_{dy}'\|}{\|I_{dx}'' + I_{dy}''\|}\right) \quad \text{[Equation 5]}$$

The phase acquisition portion restores the diagonal pattern phase of equation 5 through a phase unwrapping algorithm, and then partially differentiates the restored phase, represented by the following equation 7:

$$\varphi_x' = 2\pi f_x + \phi_x',\ \varphi_y' = 2\pi f_y + \phi_y' \quad \text{[Equation 7]}$$

Further, the equation 7 is integrated to separate and calculate an x axis direction phase component and a y axis direction phase component of the following equation 8:

$$\varphi_x = \int \varphi_x' dx = 2\pi f_x x + \phi_x \quad \text{[Equation 8]}$$

$$\varphi_y = \int \varphi_y' dy = 2\pi f_y y + \phi_y$$

According to a second aspect of the present disclosure, it can be achieved by a method for real-time acquisition of a three dimensional phase using a diagonal fringe pattern in the deflectometry applied to real-time three dimensional shape measurement of freeform surfaces, the method for real-time acquisition of a three dimensional phase using a diagonal fringe pattern including steps of: S1: a pattern generation portion generates a sing-direction pattern in the diagonal direction and projects the generated pattern onto a measurement object; S2: a detector obtains an image of a deformed pattern reflected from the measurement object; S3: a phase acquisition portion normalizes a first-order derivation component and a second-order derivation component for a diagonal pattern and divides each other to calculate a diagonal pattern phase; S4: the phase acquisition portion performs a partial derivation in the x direction and a partial derivation in the y direction for the diagonal pattern; and S5: the phase acquisition portion integrates partial derivations respectively, to obtain an x axis direction phase component and a y axis direction phase component.

After S 3, the method for real-time acquisition of a three dimensional phase using a diagonal fringe pattern further includes a steps of restoring the diagonal pattern phase to an unwrapped phase through a phase unwrapping algorithm.

A third aspect of the present disclosure, it can be achieved by a recording medium in which a computer program that performs an acquisition method is recorded.

A fourth aspect of the present disclosure, it can be achieved by a system for real-time acquisition of a three dimensional phase using a diagonal fringe pattern in the method for real-time three dimensional shape measurement of free surfaces, the system for real-time acquisition of a three dimensional phase using a diagonal fringe pattern comprising: a phase acquisition system according to the aforementioned first aspect: a gradient computing portion that computes an X direction gradient component from an x axis direction phase component obtained from the phase acquisition system, and computes a Y direction gradient component from a y axis direction phase component; and an analysis unit that analyses three dimensional shape of a measurement object based on the X direction gradient component and the Y direction gradient component.

A fifth aspect of the present disclosure, it can be achieved by a method for real-time measurement method of a three dimensional phase using a diagonal fringe pattern in the method for real-time three dimensional shape measurement of free surfaces, the method for real-time measurement method of a three dimensional phase using a diagonal fringe pattern comprising steps of: S1: a pattern generation portion generates a single-direction pattern in the diagonal direction and projects the generated pattern onto a measurement object; S2: a detector obtains an image of a deformed pattern reflected form the measurement object; S3: a phase acquisition portion calculates a diagonal pattern phase by normalizing a first-order derivation component and a second-order derivation components for a diagonal pattern and dividing each other; S4: the diagonal patter phase is restored through a phase unwrapping algorithm; S5: the phase acquisition portion a partial derivation in the x direction and a partial derivation in the y direction for the diagonal pattern; S6: the phase acquisition portion integrates partial derivations respectively, to obtain an x axis direction phase component and a y axis direction phase component; S7: a gradient computing portion computes an X direction gradient component from an x axis direction phase component obtained from the phase acquisition system; and S8: an analysis unit analyzes a three dimensional shape of the measurement object based on the X direction gradient component and the Y direction gradient component.

Advantageous Effects

According to a real-time three dimensional deflectometry system and shape measurement method using a diagonal pattern scanning method in accordance of an embodiment of the present disclosure, it is capable of effectively and quickly separate the X direction and Y direction gradient components through derivation and integration, using a single-direction pattern in the diagonal direction instead of using a composite pattern that scans patterns in the x direction and y direction simultaneously.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

REFERENCE NUMBERS

1: Measurement object
10: Pattern generation portion (Screen)
20: Detector (Camera)

DETAILED DESCRIPTION

Best Mode

Hereinafter, a system and method for real-time measurement of a three dimensional shape using a diagonal fringe pattern according to an embodiment of the present disclosure will be described, mainly focusing on a phase acquisition method using diagonal fringe pattern.

Figure 1:
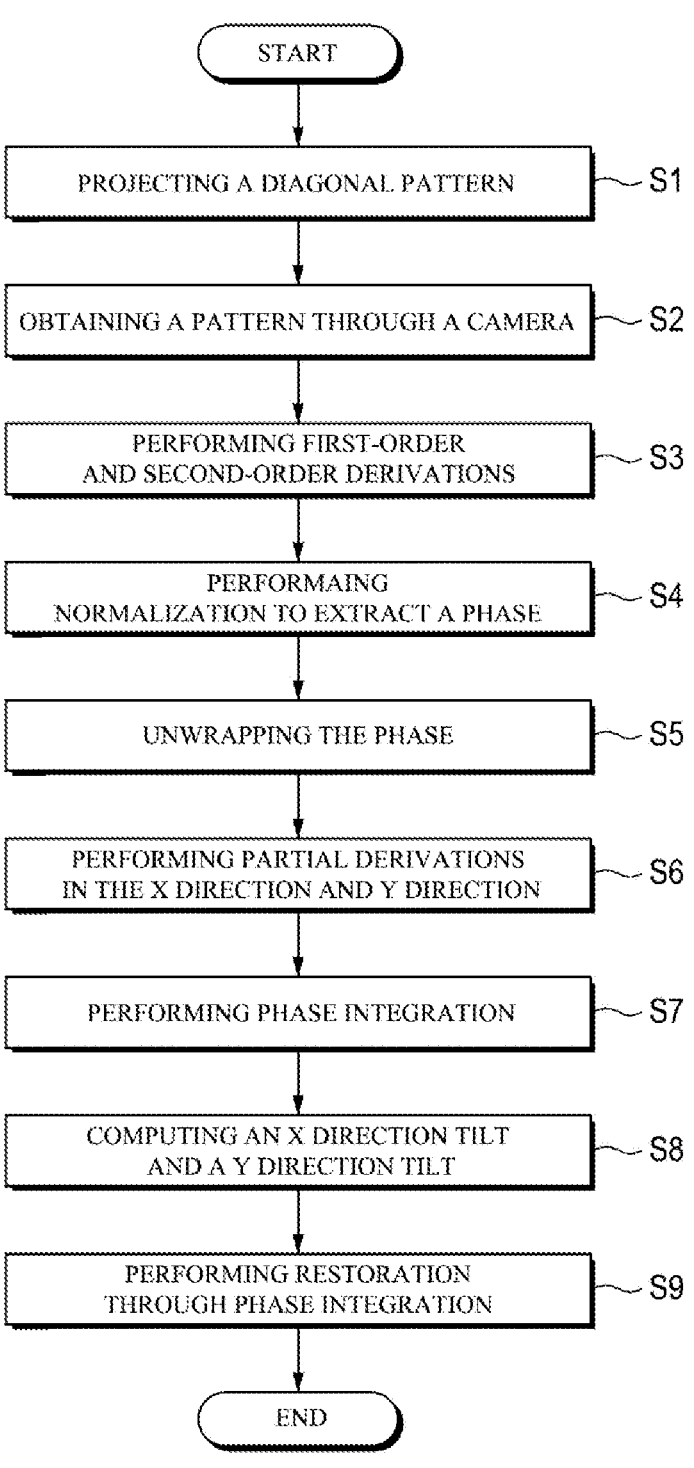
FIG. 1 show a flowchart of a method for real-time measurement of a three dimensional shape using diagonal fringe pattern according to an embodiment of the present disclosure.
Figure 2:
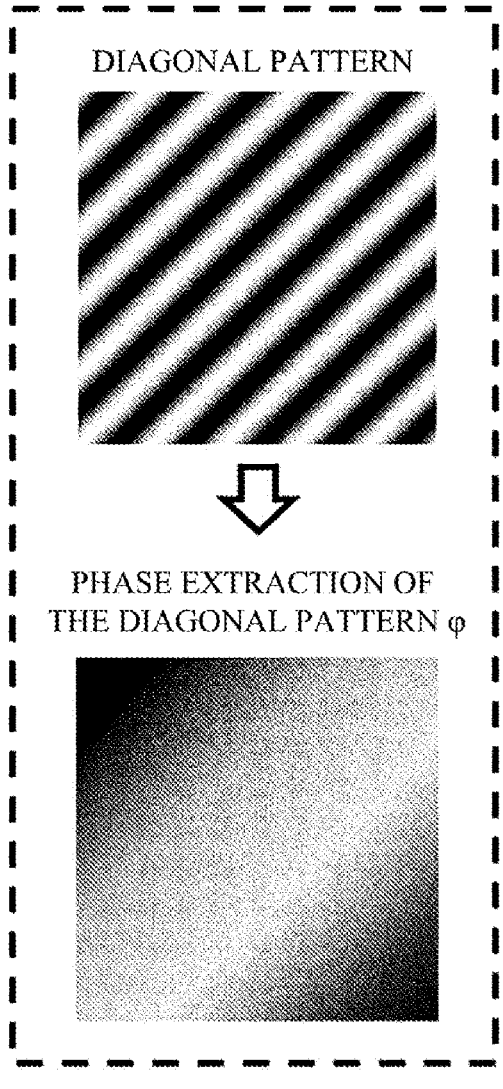
FIG. 2 shows a diagonal pattern obtained from a detector and an extracted phase of the diagonal pattern according to an embodiment of the present disclosure.
Figure 3:
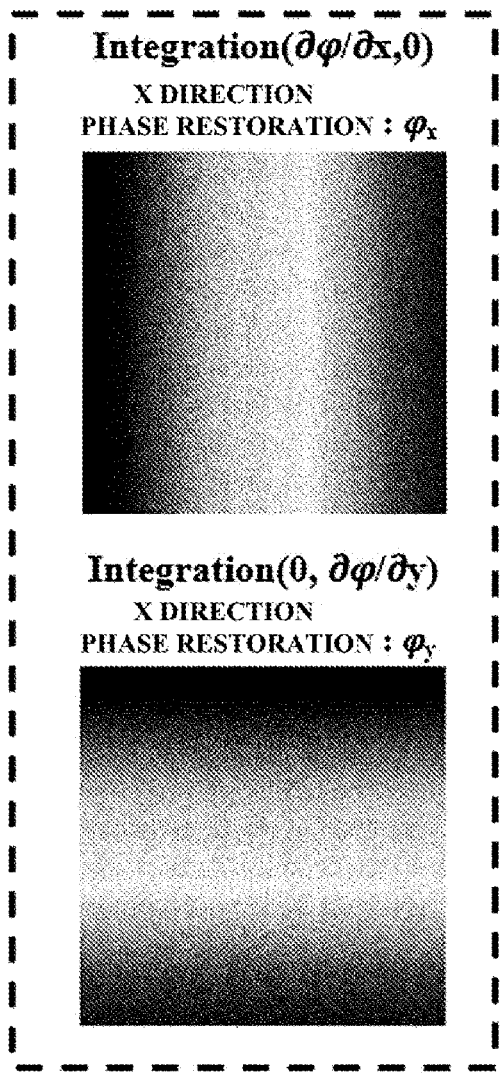
FIG. 3 shows images of an x axis direction partial derivation and a y axis direction partial derivation of the diagonal pattern in FIG. 2.
Figure 4:
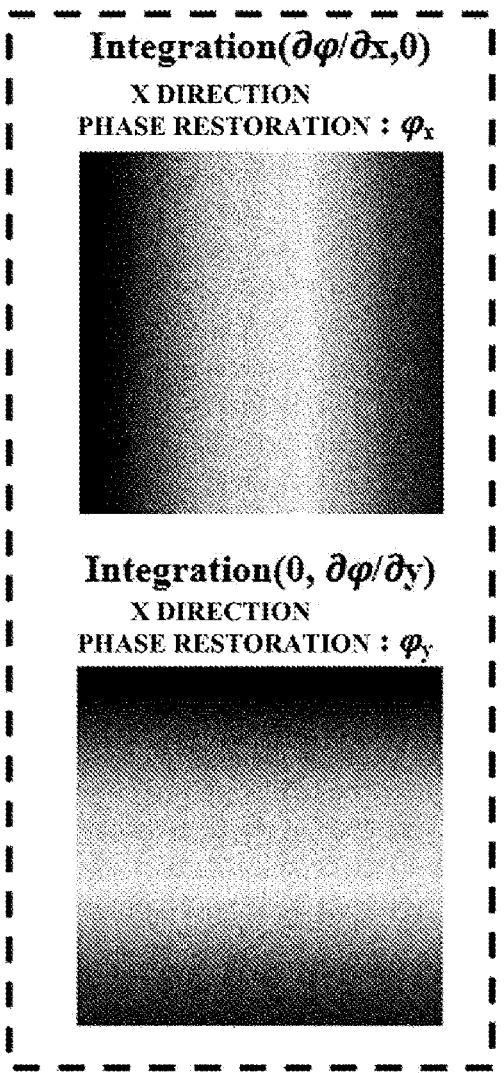
FIG. 4 shows images of an x axis direction phase and a y axis direction phase obtained through the phase integration in FIG. 3, and FIG. 5 show a flowchart of real-time measurement of a three dimensional shape processes using diagonal fringe patterns according to an embodiment of the present disclosure.
Figure 5:
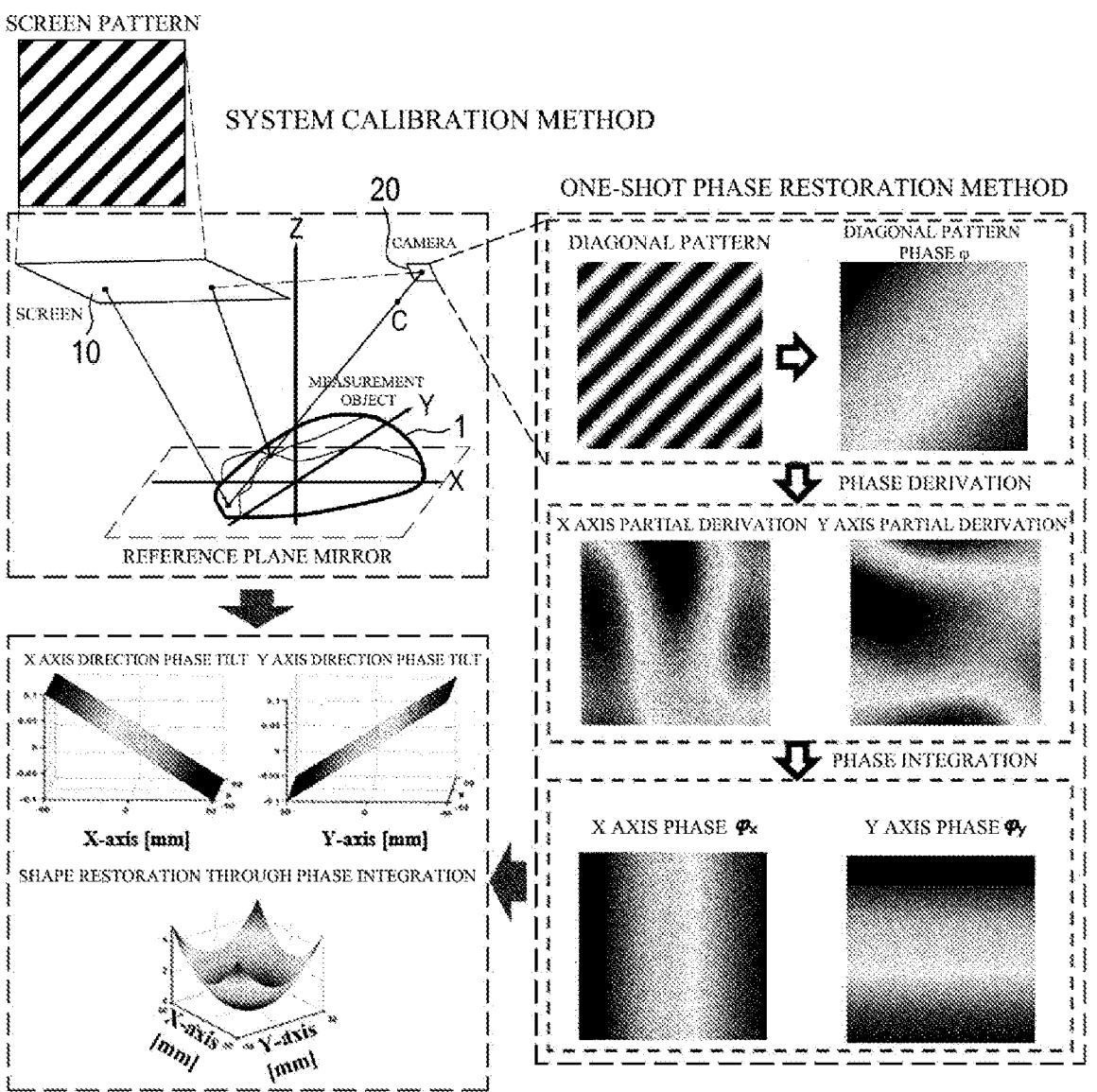

Firstly, FIG. 1 show a flowchart of a method for real-time measurement of a three dimensional shape using diagonal fringe pattern according to an embodiment of the present disclosure. FIG. 2 shows a diagonal pattern obtained from a detector and an extracted phase of the diagonal pattern according to an embodiment of the present disclosure. FIG. 3 shows images of an x axis direction partial derivation and a y axis direction partial derivation of the diagonal pattern in FIG. 2. FIG. 4 shows images of an x axis direction phase and a y axis direction phase obtained through the phase integration in FIG. 3. FIG. 5 show a flowchart of real-time measurement of a three dimensional shape processes using diagonal fringe patterns according to an embodiment of the present disclosure.

In order to measure a three dimensional shape of a measurement object through the deflectometry, x axis direction and y axis direction phases of the measurement object are supposed to be measured. According to an embodiment of the present disclosure, a novel method for measuring these phases quickly and accurately is proposed.

In the embodiment of the present disclosure, a single-direction pattern in the diagonal direction is used instead of using a composite pattern that scans patterns in the x direction and y direction simultaneously.

Furthermore, the core technical feature of the present disclosure is to effectively separate an x axis direction gradient component and a y axis direction gradient component through derivation and integration.

According to the embodiment of the present disclosure, a system for real-time shape measurement using diagonal fringe patterns may include a pattern generation portion 10, a detector 20, a phase acquisition portion, a gradient computing portion, an analysis unit, etc.

The pattern generation portion 10 (screen) generates a sing-direction pattern in the diagonal direction and projects the generated pattern on a measurement object 1. A detector 20 (camera) obtains an image of a deformed pattern reflected form the measurement object 1. The phase acquisition portion partially differentiates a diagonal pattern phase in the x axis and y axis directions respectively, and integrates each partial derivation to obtain an x axis phase component and a y axis direction phase component. The gradient computing portion computes an X direction gradient component from the x axis phase component and a Y direction gradient component from the y axis direction phase component. The analysis unit analyzes a three dimensional shape of the measurement object 1 based on the X direction gradient and the Y direction gradient.

DESCRIPTION OF EMBODIMENTS

A screen 10 generates a single-direction pattern in the diagonal direction and projects the generated pattern on a measurement object 1 (S1). This single-direction pattern in the diagonal direction is represented by the following equation 1.

$$I_s(x_s, y_s) = \left(\frac{G}{2}\right)\{1 + \cos(2\pi f_x x_s + 2\pi f_y y_s)\}, \qquad \text{[Equation 1]}$$

In Equation 1, G is an arbitrary constant value representing a background light and a modulation amplitude, $f_x$ and $f_y$ represent carrier frequency components in the x axis and y axis directions, and $(x_s, y_s)$ represents a position of a screen pixel.

A Camera 20 obtains an image of a deformed diagonal pattern reflected from the measurement object 1 (S2).

An obtained pattern obtained through the camera 20 is represented by the following equation 2.

$$I_d(x, y) = \qquad \text{[Equation 2]}$$
$$A(x, y) + B(x, y) \cos \{2\pi f_x x + 2\pi f_y y + \phi_x(x, y) + \phi_y(x, y)\},$$

wherein
(x,y) is a camera pixel position, A(x,y) and B(x,y) represent a background light component and a modulation amplitude, and $\varphi_x$ and $\varphi_y$ represent an x direction phase component and a y direction phase component of the measured object.

As inspired by the proposed by Wang (Wang, H., et al., "Fast and high precision spatial carrier frequency phase shifting algorithm based on the second order difference", Optics Communications, 2020. 454), in order to quickly and accurately extract the single-direction pattern in the diagonal direction, the first-order and second-order derivations are used (S3). At this time, it is assumed that the background light and the modulation amplitude have almost no size changes in the x axis and y axis directions. In the following equation 3, (x,y) is omitted for the sake of brevity.

$$I'_{dx} = -2\pi f_x B \sin\{\varphi\}, \ I'_{dy} = -2\pi f_y B \sin\{\varphi\} \qquad \text{[Equation 3]}$$

$$I'_{dx} = -4\pi^2 f_x^2 B \cos\{\varphi\}, \ I'_{dy} = -4\pi^2 f_y^2 B \cos\{\varphi\}, \qquad \text{[Equation 4]}$$

wherein $$\varphi = 2\pi f_x x + 2\pi f_y y + \phi_x(x, y) + \phi_y(x, y).$$

From the above equations, the first-order derivation, $$I'_{dx} + I'_{dy},$$

and the second-order derivation, $$I^*_{dx} + I^*_{dy}$$

are normalized and then divided by each other, the diagonal pattern phase is represented by the following equation 5 (S5).

$$\varphi = \arctan\left(\frac{\|I'_{dx} + I'_{dy}\|}{\|I''_{dx} + I''_{dy}\|}\right); \qquad \text{[Equation 5]}$$

wherein
‖K‖ is the normalization of K value, and it is calculated as in the following equation 6, $$\|K(x, y)\| = \frac{K(x, y)}{\sqrt{\sum_{x=1}^{M}\sum_{y=1}^{N}[K(x, y)]^2}}, \qquad \text{[Equation 6]}$$

wherein
M and N represent sizes in x axis and y axis directions of K(x,y), respectively. A phase acquired form equation 26 is a wrapped phase due to phase ambiguity and thus is supposed to be restored through the phase unwrapping algorithm (Goldstein, R. M., Zebker, H. A., & Werner, C. L. Satellite radar interferometry: two-dimensional phase unwrapping. Radio Science.23, 713-720 (1988)).

Then, in order to separate an x axis direction component and a y axis direction component, the restored phase is first-order differentiated in the x axis and y axis directions once again (S6).

$$\varphi'_x = 2\pi f_x + \phi'_x, \ \varphi'_y = 2\pi f_y + \phi'_y \qquad \text{[Equation 7]}$$

Only single-direction phase component remains due to each of partial derivations in the x axis direction and y axis direction.

Then, each of the x axis direction phase component and the y axis direction phase component are separated through integration as follows (S7).

$$\varphi_x = \int \varphi'_x dx = 2\pi f_x x + \phi_x \qquad \text{[Equation 8]}$$

$$\varphi_y = \int \varphi'_y dy = 2\pi f_y y + \phi_y$$

According to the aforementioned processes, the x axis direction component and the y axis direction component, which are required in the deflectometry, are obtainable quickly.

The core technical feature of the present disclosure is to effectively and quickly extract the phase components in x axis direction and the y axis direction phase through derivation and integration.

As shown in FIG. 5, it is summarized that the diagonal pattern generated from the screen 10 is projected onto the measurement object. Then, the projected pattern is reflected from the measurement object 1 and an image thereof is obtained through the camera 20.

The phase components in the x axis direction and the y axis direction of the obtained image of the diagonal pattern is measured through the aforementioned phase restoration algorithm, respectively.

Then, the measured phase components are converted into an axis direction surface gradient component and a y axis direction surface gradient component (S8) and a three dimensional shape is finally measured through a shape restoration algorithm (S9).

The invention claimed is:
1. In a deflectometry applied to real-time three dimensional shape measurement of freeform surfaces, a system for real-time acquisition of a three dimensional phase using a diagonal fringe pattern, the system comprising:
a pattern generation portion that generates a single-direction pattern in the diagonal direction and project the generated pattern onto a measurement object;
a detector that obtains an image of a deformed pattern reflected from the measurement object; and
a phase acquisition portion that partially differentiates and integrates a phase of the diagonal fringe pattern in the x axis direction and y axis direction respectively, to obtain an x axis direction phase component and a y direction phase component,
wherein:
a single-direction pattern in the diagonal direction generated from the pattern generation portion is represented by the following equation 1:

$$I_s(x_s, y_s) = \left(\frac{G}{2}\right)\{1 + \cos(2\pi f_x x_s + 2\pi f_x y_s)\}, \qquad \text{[Equation 1]}$$

wherein
G is an arbitrary constant value representing a background light and a modulation amplitude, $f_x$ and $f_y$ represent carrier frequency components in the x axis and y axis directions, and $(x_s, y_s)$ represents a position of a screen pixel;
a pattern obtained through the detector is represented by the following equation 2:

$$I_d(x, y) = \qquad\qquad \text{[Equation 2]}$$

$$A(x, y) + B(x, y) \cos \{2\pi f_x x + 2\pi f_y y + \varphi_x(x, y) + \varphi_y(x, y)\},$$

wherein (x,y) is a camera pixel position, A (x,y) and B (x,y) represent a background light component and a modulation amplitude, and $\varphi_x$ and $\varphi_y$ represent an x direction phase component and a y direction phase component of the measured object;

the diagonal pattern phase is calculated by normalizing a first-order derivation component and a second-order derivation component, wherein the first-order derivation component is divided by the second-order derivation component in equation 2;

the first-order derivation component, $$I'_{dx} + I'_{dy}$$

is calculated from the following equation 3:

$$I'_{dx} = -2\pi f_x B \sin\{\varphi\}, \; I'_{dy} = -2\pi f_y B \sin\{\varphi\} \qquad \text{[Equation 3]}$$

the second-order derivation component, $$I^*_{dx} + I^*_{dy}$$

is calculated from the following equation 4:

$$I''_{dx} = -4\pi^2 f_x^2 B \cos\{\varphi\}, \; I''_{dy} = -4\pi^2 f_y^2 B \cos\{\varphi\}; \qquad \text{[Equation 4]}$$

the diagonal pattern phase is represented by the following equation 5:

$$\varphi = \arctan\left(\frac{\|I'_{dx} + I'_{dy}\|}{\|I''_{dx} + I''_{dy}\|}\right); \qquad \text{[Equation 5]}$$

the phase acquisition portion restores the diagonal pattern phase of equation 5 through a phase unwrapping algorithm, and then partially differentiates the restored phase, represented by the following equation 7:

$$\varphi'_x = 2\pi f_x + \phi'_x, \; \varphi'_y = 2\pi f_y + \phi'_y; \qquad \text{[Equation 7]}$$

the equation 7 is integrated to separate and calculate an x axis direction phase component and a y axis direction phase component of the following equation 8:

$$\varphi_x = \int \varphi'_x dx = 2\pi f_x x + \varphi_x \quad \varphi_y = \int \varphi'_y dy = 2\pi f_y y + \varphi_y. \qquad \text{[Equation 8]}$$

2. The system for real-time acquisition of the three dimensional phase using the diagonal fringe pattern of claim 1, further comprising:

a gradient computing portion that computes an X direction gradient component from the x axis direction phase component, and computes a Y direction gradient component from the y axis direction phase component; and an analysis unit that analyses three dimensional shape of the measurement object based on the X direction gradient component and the Y direction gradient component.

3. In a deflectometry applied to real-time three dimensional shape measurement of freeform surfaces, a method for real-time acquisition of a three dimensional phase using a diagonal fringe pattern, the method comprising steps of:

S1: a pattern generation portion generates a single direction pattern in the diagonal direction and projects the generated pattern onto a measurement object;

S2: a detector obtains an image of a deformed pattern reflected from the measurement object;

S3: a phase acquisition portion normalizes a first-order derivation component and a second-order derivation component for the diagonal fringe pattern, wherein the first-order derivation component is divided by the second-order derivation component, to calculate a diagonal pattern phase;

S4: the phase acquisition portion performs a partial derivation in the x direction and a partial derivation in the y direction for the diagonal pattern; and S5: the phase acquisition portion integrates partial derivations respectively, to obtain an x axis direction phase component and a y axis direction phase component, wherein:

the single-direction pattern in the diagonal direction generated from the pattern generation portion is represented by the following equation 1:

$$I_s(x_s, y_s) = \left(\frac{G}{2}\right)\{1 + \cos(2\pi f_x x_s + 2\pi f_x y_s)\}, \qquad \text{[Equation 1]}$$

wherein

G is an arbitrary constant value representing a background light and a modulation amplitude, $f_x$ and $f_y$ represent carrier frequency components in the x axis and y axis directions, and $(x_s, y_s)$ represents a position of a screen pixel;

a pattern obtained through the detector is represented by the following equation 2:

$$I_d(x, y) = \qquad\qquad \text{[Equation 2]}$$

$$A(x, y) + B(x, y)\cos\{2\pi f_x x + 2\pi f_y y + \varphi_x(x, y) + \varphi_y(x, y)\},$$

wherein (x,y) is a camera pixel position, A(x,y) and B(x,y) represent a background light component and a modulation amplitude, and $\varphi_x$ and $\varphi_y$ represent an x direction phase component and a y direction phase component of the measured object;

the diagonal pattern phase is calculated by normalizing the first-order derivation component and the second-order derivation component, wherein the first-order derivation component is divided by the second-order derivation component in equation 2;

the first-order derivation component, $$I'_{dx} + I'_{dy}$$

is calculated from the following equation 3:

$$I'_{dx} = -2\pi f_x B \, \sin\{\varphi\}, \; I'_{dy} = -2\pi f_y B \, \sin\{\varphi\} \qquad \text{[Equation 3]}$$

the second-order derivation component, $$I''_{dx} + I''_{dy}$$

is calculated from the following equation 4:

$$I''_{dx} = -4\pi^2 f_x^2 B \, \cos\{\varphi\}, \; I''_{dy} = -4\pi^2 f_y^2 B \, \cos\{\varphi\}; \qquad \text{[Equation 4]}$$

the diagonal pattern phase is represented by the following equation 5:

$$\varphi = \arctan\left(\frac{\left\| I'_{dx} + I'_{dy} \right\|}{\left\| I''_{dx} + I''_{dy} \right\|}\right); \qquad \text{[Equation 5]}$$

the phase acquisition portion restores the diagonal pattern phase of equation 5 through a phase unwrapping algorithm, and then partially differentiates the restored phase, represented by the following equation 7:

$$\varphi'_x = 2\pi f_x + \varphi'_x, \; \varphi'_y = 2\pi f_y + \varphi'_y; \qquad \text{[Equation 7]}$$

the equation 7 is integrated to separate and calculate an x axis direction phase component and a y axis direction phase component of the following equation 8:

$$\varphi_x = \int \varphi'_x dx = 2\pi f_x x + \varphi_x \quad \varphi_y = \int \varphi'_y dy = 2\pi f_y y + \varphi_y. \qquad \text{[Equation 8]}$$

4. The method for real-time acquisition of the three dimensional phase using the diagonal fringe pattern of claim 3, further comprising a step of:
   restoring the diagonal pattern phase to an unwrapped phase through a phase unwrapping algorithm, following S3.

5. A non-transitory recording medium in which a computer program that performs the acquisition method according to claim 4 is recorded.

6. A non-transitory recording medium in which a computer program that performs the acquisition method according to claim 3 is recorded.

7. In a method for real-time three dimensional shape measurement of free surfaces, a method for real-time measurement method of a three dimensional phase using a diagonal fringe pattern, the method comprising steps of:

S1: a pattern generation portion generates a single-direction pattern in the diagonal direction and projects the generated pattern onto a measurement object;

S2: a detector obtains an image of a deformed pattern reflected form the measurement object;

S3: a phase acquisition portion calculates a diagonal pattern phase by normalizing a first-order derivation component and a second-order derivation component for the diagonal fringe pattern, wherein the first-order derivation component is divided by the second-order derivation component;

S4: the diagonal pattern phase is restored through a phase unwrapping algorithm;

S5: the phase acquisition portion a partial derivation in the x direction and a partial derivation in the y direction for the diagonal pattern;

S6: the phase acquisition portion integrates partial derivations respectively, to obtain an x axis direction phase component and a y axis direction phase component;

S7: a gradient computing portion computes an X direction gradient component from an x axis direction phase component obtained from the phase acquisition system and computes a Y direction gradient component from a y axis direction phase component obtained from the phase acquisition system; and S8: an analysis unit analyzes a three dimensional shape of the measurement object based on the X direction gradient component and the Y direction gradient component, wherein:

the single-direction pattern in the diagonal direction generated from the pattern generation portion is represented by the following equation 1:

$$I_s(x_s, y_s) = \left(\frac{G}{2}\right)\{1 + \cos(2\pi f_x x_s + 2\pi f_y y_s)\}, \qquad \text{[Equation 1]}$$

wherein

G is an arbitrary constant value representing a background light and a modulation amplitude, $f_x$ and $f_y$ represent carrier frequency components in the x axis and y axis directions, and $(x_s, y_s)$ represents a position of a screen pixel;

a pattern obtained through the detector is represented by the following equation 2:

$$I_d(x, y) = \qquad \text{[Equation 2]}$$
$$A(x, y) + B(x, y)\cos\{2\pi f_x x + 2\pi f_y y + \varphi_x(x, y) + \varphi_y(x, y)\},$$

wherein (x,y) is a camera pixel position, A(x,y) and B(x,y) represent a background light component and a modulation amplitude, and $\varphi_x$ and $\varphi_y$ represent an x direction phase component and a y direction phase component of the measured object;

the diagonal pattern phase is calculated by normalizing the first-order derivation component and the second-order derivation component, wherein the first-order derivation component is divided by the second-order derivation component in equation 2;

the first-order derivation component, $$I'_{dx} + I'_{dy}$$

5 is calculated from the following the first-order derivation component, equation 3:

$$I'_{dx} = -2\pi f_x B \sin\{\varphi\}, \ I'_{dy} = -2\pi f_y B \sin\{\varphi\} \qquad \text{[Equation 3]}$$

10 the second-order derivation component, $$I''_{dx} + I''_{dy}$$

15 is calculated from the following equation 4:

$$I''_{dx} = -4\pi^2 f_x^2 B \cos\{\varphi\}, \ I''_{dy} = -4\pi^2 f_y^2 B \cos\{\varphi\}; \qquad \text{[Equation 4]}$$

the diagonal pattern phase id represented by the following equation 5:

20

25

$$\varphi = \arctan\left(\frac{\|I'_{dx} + I'_{dy}\|}{\|I''_{dx} + I''_{dy}\|}\right); \qquad \text{[Equation 5]}$$

the phase acquisition portion restores the diagonal pattern phase of equation 5 through a phase unwrapping algorithm, and then partially differentiates the restored phase, represented by the following equation 7:

$$\varphi'_x = 2\pi f_x + \varphi'_x, \ \varphi'_y = 2\pi f_y + \varphi'_y; \qquad \text{[Equation 7]}$$

the equation 7 is integrated to separate and calculate an x axis direction phase component and a y axis direction phase component of the following equation 8:

$$\varphi_x = \int \varphi'_x dx = 2\pi f_x x + \varphi_x \ \ \varphi_y = \int \varphi'_y dy = 2\pi f_y y + \varphi_y. \qquad \text{[Equation 8]}$$

* * * * *